(12) United States Patent
Chan

(10) Patent No.: US 11,708,986 B1
(45) Date of Patent: Jul. 25, 2023

(54) SMART IOT ENERGY SAVING SOUND WAVE AIR FILTER SYSTEM AND USE FOR AIR PURIFIERS AND A METHOD OF AIR FILTRATION THEREOF

(71) Applicant: INTELLYTIC VENTURES LTD, Hong Kong (HK)

(72) Inventor: Steven Nai-Kin Chan, Hong Kong (HK)

(73) Assignee: INTELLYTIC VENTURES LTD, Hong Kong (HK)

( * ) Notice: Subject to any disclaimer, the term of this patent is extended or adjusted under 35 U.S.C. 154(b) by 0 days.

(21) Appl. No.: 17/862,436

(22) Filed: Jul. 12, 2022

(51) Int. Cl.
| | |
|---|---|
| F24F 11/39 | (2018.01) |
| F24F 11/58 | (2018.01) |
| F24F 11/77 | (2018.01) |
| F24F 8/108 | (2021.01) |
| F24F 11/46 | (2018.01) |

(Continued)

(52) U.S. Cl.
CPC ............ F24F 11/39 (2018.01); B01D 46/429 (2013.01); B01D 46/4245 (2013.01); F24F 8/108 (2021.01); F24F 11/46 (2018.01); F24F 11/58 (2018.01); F24F 11/77 (2018.01); F24F 11/88 (2018.01); B01D 2259/816 (2013.01); F24F 11/72 (2018.01); F24F 2110/40 (2018.01)

(58) Field of Classification Search
CPC ............ B01D 11/0265; B01D 46/4245; B01D 46/429; B01D 2259/816; B01D 2323/56; F24F 11/72; F24F 11/74; F24F 11/77; F24F 11/39; F24F 11/46; F24F 11/58; F24F 11/88; F24F 2110/40; F24F 8/108

USPC ........................................................ 454/229
See application file for complete search history.

(56) References Cited

U.S. PATENT DOCUMENTS

3,286,732 A * 11/1966 Alley ..................... F24F 13/15
                                                     137/601.11
3,342,211 A *  9/1967 Johnson ................. F16K 1/165
                                                     454/334

(Continued)

FOREIGN PATENT DOCUMENTS

| CA | 2859557 C | * | 12/2020 | ........... F04D 19/002 |
| CN | 103223275 A | * | 7/2013 | ......... B01D 46/0086 |

(Continued)

OTHER PUBLICATIONS

"What is Zigbee?" (c) SORACOM, Inc (Year: 2020).*

*Primary Examiner* — Edelmira Bosques
*Assistant Examiner* — Frances F. Hamilton

(57) ABSTRACT

An air filter and a method of air filtration using the air filter are described. The air filter may comprise a filter media adapted to capture and filter one or more impurities from air. Further, one or more sound wave generators are attached at one or more sides of the filter media. The one or more sound wave generators generate acoustic waves to be propagated into the filter media. The air filter may further comprise a plurality of sensors positioned before the filter media and after the filter media. Further at least one fan is positioned before or after the filter media. Further an IoT is configured to control frequency of the acoustic waves generated by the one or more sound waves generators, and interconnected with power signal control panel parallel, AHU to control rotational speed of the at least one fan based on value provided by the plurality of sensors.

23 Claims, 13 Drawing Sheets

(51) Int. Cl.
*F24F 11/88* (2018.01)
*B01D 46/42* (2006.01)
*F24F 110/40* (2018.01)
*F24F 11/72* (2018.01)

(56) References Cited

U.S. PATENT DOCUMENTS

| | | | | |
|---|---|---|---|---|
| 3,954,426 A * | 5/1976 | Brange | ................ | B01D 46/71 |
| | | | | 95/280 |
| 4,201,556 A * | 5/1980 | Olsson | ................ | B01D 46/10 |
| | | | | 95/280 |
| 5,761,908 A * | 6/1998 | Oas | .................... | F24H 4/06 |
| | | | | 454/238 |
| 6,221,258 B1 * | 4/2001 | Feke | ................ | B01D 24/4631 |
| | | | | 210/780 |
| 8,845,785 B2 * | 9/2014 | Kusuura | ................ | F24F 8/10 |
| | | | | 95/71 |
| 2003/0157882 A1 * | 8/2003 | Boulanger | ............ | F24F 11/75 |
| | | | | 454/256 |
| 2009/0217651 A1 * | 9/2009 | Jobson | ................ | B01D 51/08 |
| | | | | 60/299 |
| 2011/0244775 A1 * | 10/2011 | Haugen | ................ | B01D 46/446 |
| | | | | 454/284 |
| 2013/0197829 A1 * | 8/2013 | Sherman, III | ..... | B01D 46/0086 |
| | | | | 702/45 |
| 2014/0067135 A1 * | 3/2014 | Lehnert | ................ | F24F 11/62 |
| | | | | 700/276 |
| 2015/0338314 A1 * | 11/2015 | Meyer | ................ | G01M 99/005 |
| | | | | 73/40 |
| 2016/0061476 A1 * | 3/2016 | Schultz | ................ | F24F 11/30 |
| | | | | 700/276 |
| 2016/0063833 A1 * | 3/2016 | Schultz | ................ | G08B 19/00 |
| | | | | 340/522 |
| 2017/0197171 A1 * | 7/2017 | Sze To | ................ | B01D 46/0053 |
| 2018/0140989 A1 * | 5/2018 | Arthur | ................ | B01D 46/521 |
| 2018/0154297 A1 * | 6/2018 | Maletich | ................ | F24F 8/158 |
| 2019/0083908 A1 * | 3/2019 | Remboski | ................ | B03C 1/28 |
| 2019/0101306 A1 * | 4/2019 | Giorgi | ................ | F24F 13/10 |
| 2020/0141604 A1 * | 5/2020 | Chen | ................ | F24F 11/39 |
| 2020/0149766 A1 * | 5/2020 | Kisakibaru | ................ | F24F 11/0001 |
| 2020/0256578 A1 * | 8/2020 | Meis | ................ | B01D 46/521 |
| 2021/0207833 A1 * | 7/2021 | Dameno | ................ | F24F 11/46 |
| 2021/0252443 A1 * | 8/2021 | Ramphal | ................ | B01D 46/10 |
| 2022/0010996 A1 * | 1/2022 | Carrieri | ................ | F24F 11/63 |
| 2022/0099697 A1 * | 3/2022 | Arens | ................ | G01F 1/667 |
| 2022/0290886 A1 * | 9/2022 | Frenk | ................ | B01D 46/446 |

FOREIGN PATENT DOCUMENTS

| | | | | |
|---|---|---|---|---|
| EP | 3136012 A1 * | 3/2017 | | |
| EP | 3489592 A1 * | 5/2019 | | |
| ES | 2367277 T3 * | 11/2011 | ........... | F04D 27/001 |
| JP | 3088061 U * | 6/2002 | ............ | B01D 46/42 |
| KR | 20110113900 A | 4/2010 | | |
| KR | 20210123135 A * | 10/2021 | | |
| WO | WO-2008083138 A1 * | 7/2008 | ............... | G01N 1/02 |
| WO | WO-2012147050 A1 * | 11/2012 | .......... | B01D 46/0065 |

* cited by examiner

New frame assembly for performance of air purifier

SMART IOT ENERGY SAVING SOUND WAVE AIR FILTER SYSTEM AND USE FOR AIR PURIFIERS AND A METHOD OF AIR FILTRATION THEREOF

CROSS-REFERENCE TO RELATED APPLICATIONS AND PRIORITY

The present application does not claim any priority from any co-pending patent application.

TECHNICAL FIELD

The present application described herein, in general, relates to an air filter system and more particularly to an IoT based air filter system configured to save energy and further enable preventive maintenance.

BACKGROUND

In the present scenario, 80% of air filtering device's life cycle cost may be attributed to energy consumption, which is due to an extra energy consumed by a driving fan to overcome a pressure drop in an air stream flowing across the air filtering device while maintaining a designated air flow rate. It has been observed that, higher is a filtration efficiency of the air filter, greater is the pressure drop across the filter thereby resulting in higher consumption of the energy.

Today, most of the home are equipped with an air purifier having one or more air filtering device. Thus, highlighting the need to reduce the energy cost of owning the air filter. The Energy Saving Sound Wave for air filtering is such one solution playing an important role in indoor air quality as well as reducing consumption of significant portion of energy in a residential building.

The Air filtering device generally has a lower filtration efficiency on smaller particles, which has a more significant impact on health and on manufacturing processes that require clean air environment. To effectively remove these very fine particles, densely packed filter media is usually used, which results in high pressure drop across the filter. High efficiency air filtering device generally has a higher filtration efficiency on particles with size larger than 1 micrometer than the value indicated by the efficiency rating of the High efficiency air filter device.

High efficiency air purifiers are also essential in offices/ hotels as well as medical facilities. The high efficiency air purifiers for medical facilities may further require high efficiency particulate air (HEPA) filters which often include densely packed fiber material, which is both cost and energy expensive is largely used in the medical facilities or commercial facilities that need to deal better with small particulate matter.

There have been efforts made in the past on refining the micro and mini structure of air filtering device to reduce the pressure drop. However, due to the physical limits of fluid mechanics, there still exists a long-standing need for improved systems/devices and methods that facilitates in further reduction of the pressure drop, especially in high efficiency air filters.

SUMMARY

This summary is provided to introduce concepts related to an Energy Saving Sound Wave air filtering device and methods for air purifier and the concepts are further described below in the detailed description. This summary is not intended to identify essential features of the claimed subject matter, nor it is intended for use in determining or limiting the scope of the claimed subject matter.

In one implementation, an air filtering device is disclosed. The air filtering device may comprise a filter media adapted to capture and filter one or more impurities from air. The air filtering device may further comprise one or more sound wave generating means attached at one or more sides of the filter media, wherein the one or more sound wave generating means generate sound waves to be propagated into the filter media. The propagation of the sound waves into the filter media may facilitate in increasing travel distance of the one or more impurities inside the filter media thereby enabling the filter media to intercept the one or more impurities. The propagation of the sound waves into the filter media may further facilitate in generating turbulence in the filter media thereby enabling the filter media to enhance the capturing of the one or more impurities based on enhanced turbulent diffusion effect. The propagation of the sound waves into the filter media may further facilitate in generating frictional electrostatic charges on the filter media thereby enabling the filter media to attract the one or more impurities. The air filter further comprises a plurality of sensors configured to detect pressure drop before and after air enters the filter media, wherein the plurality of sensors is also configured to detect voltage and ampere to determine particulate matter (PM). Further at least one fan connected positioned before or after the filter media. The air filter further comprises a IoT configured to control frequency of the acoustic waves generated by the one or more sound waves generating means, and to control rotational speed of the at least one fan based on value provided by the plurality of sensors.

In another implementation, a method of air filtration by an air filtering device is disclosed. The method may comprise capturing, via a filter media, one or more impurities from air. The method may further comprise generating, via one or more sound generating means, sound waves to be propagated into the filter media. The propagation of the sound waves into the filter media may facilitate in increasing travel distance of the one or more impurities inside the filter media thereby enabling the filter media to intercept the one or more impurities. The propagation of the sound waves into the filter media may further facilitate in generating turbulence in the filter media thereby enabling the filter media to enhance the capturing of the one or more impurities based on enhanced turbulent diffusion effect. The propagation of the sound waves into the filter media may further facilitate in generating frictional electrostatic charges on the filter media thereby enabling the filter media to attract the one or more impurities. The method comprises detecting, via a plurality of sensors, a pressure drops before and after air enters filter media, and voltage and ampere to determine particulate matter (PM). The method may further comprise controlling, via IoT based on narrowband, frequency of the sound waves generated by the one or more sound wave generating means, and rotational speed of a fan positioned either before or after the filter media.

In yet another implementation, an air filtration apparatus is disclosed. The air filtration apparatus may comprise an air filter media. The air filtration apparatus may further comprise one or more sound wave generating devices attached at the one or more sides of the filter media, wherein the one or more sound wave generating devices generates sound waves to be propagated inside the air filter media thereby enabling the filter media to intercept and filter one or more impurities from the air. Further, the air filtration apparatus may comprise a frame securing the air filter media and the one or more sound wave generating devices. Furthermore, the air filtration apparatus may comprise a power supply to power the one or more sound wave generating devices, the IoT, and the at least one fan. The air particle or particulate will under the energy saving sound wave to pass through MERV 7 to 8 filter media to improve the filtration efficiency from 57.87% to 93.64% to MERV rating up to 13 to 14. Remote data transmission via NB-IOT network is communicated with the cloud platform and support standard MQTT connectivity protocol, provide seamless communication with cloud platform with different components such as 1/NB-IOT Network MQTT, 2/4 x Digital Input, 3/4 x Digital Output, 4/4 x Analog input (0-10V) 5/4x Analog output (PWM or 0-10V), 6/1 UART (RS485) 7/ Panel mount, 8/24 VDC. The air filter apparatus may further comprise a plurality of sensors positioned before the filter media and after the filter media. Apparatus may further comprise at least one fan connected positioned before or after the filter media. Further the IoT may be configured to control frequency of the acoustic waves generated by the one or more sound waves generating means, and to control rotational speed of the at least one fan based on value provided by the plurality of sensors.

The customizable control logic for field control is easily found as one of feature and it can provide low power consumption for the system, the low-cost solution, easily expandable by adding more sensors, more voltmeters/current ammeters, and peripherals for the potential applications.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

Figure 1:
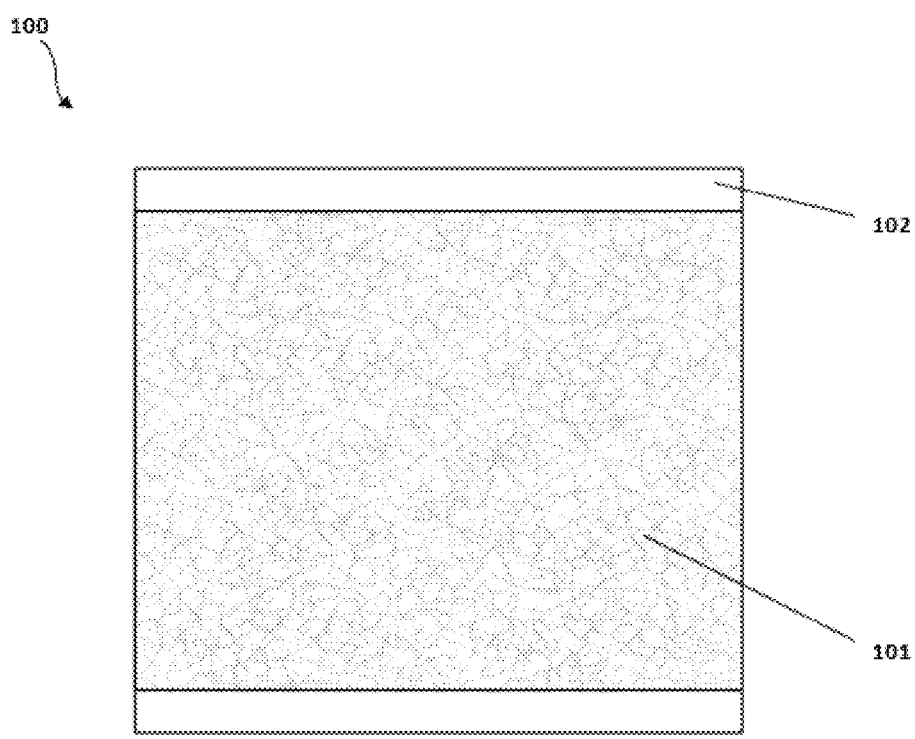
FIG. 1 illustrates a front view of an air filtration apparatus 100, in accordance with an embodiment of the present application.

It is to be noted that the figures accompanying the present application are for illustrative purpose and are not drawn in scale. Further, the electrical wirings/cables and other electronic components of the Air filtering device are not shown in figures for clarity.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any apparatuses, devices, and methods similar or equivalent to those described herein can be used in the practice or testing of embodiments of the present disclosure, the exemplary, apparatuses, devices and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The present application relates to an air filtration apparatus (hereinafter also referred as "Energy Saving Sound Wave air filtering device" or "air filter" interchangeably) and an enhanced air filtration method with the aid of sound wave. The air filter proposed in the present application has high efficiency in capturing airborne particles with low pressure drop as compared to conventional air filters. Due to the lower pressure drop, the air filter proposed in the present application further consumes less energy during operation as compared to the conventional air filters. The air filtration method proposed in the present application is implemented to enhance the performance of other air filters. The air filter of the present application may be combined with other air filters to form air filtration systems or devices with higher efficiency.

In accordance with exemplary embodiments of the present application, energy saving sound waves may be generated in order to enhance the filtration efficiency of air filter. Under low or medium frequency, sound waves induce vibratory motion on particles suspended in air. Due to the vibratory motion induced on the particles from left to right, the probability of hitting and attaching of the particles onto the solid surface of the filter media in the air filter is significantly increased. Given the large surface area of the porous air filter media, the sound waves significantly increase the probability of trapping the particles/impurities onto the air filter thereby enhancing the filtration efficiency. The filter media may further be an antiviral layer or a different material washable layer.

In an embodiment, the particles/impurities may further comprise one or more of dust, particles, airborne microorganism, virus, and allergens. Further the filter media may be a porous layer made of material selected from a group comprising a natural fiber, a metal fiber, a metal foam, and a synthetic fiber. The natural fiber may further comprise either a meltdown cloth or a paper. The synthetic fiber may further comprise a polyester plastic material.

In accordance with aspects of the present application, the sound waves may be generated by one or more sound wave generating devices selected from a group comprising a speaker, a sound transducer, an ultrasonic transducer, and a device including a single driver element, or a voice coil used to move and control a diaphragm, and the like. The acoustic waves may be propagated into the porous air filter media and may be perpendicular to the air stream. The aforementioned air filtration method implemented by the air filter may enhance the filtration efficiency of air filter because of:

Increased travel distance of the particles inside the filter due to their additional vibration motions, making them easier to be intercepted by the filter media.

The air turbulence generated by the sound-driven air flow passing through the filter media resulting in increasing chance of the particles being captured by the filter media due to enhanced turbulent diffusion effect by angular momentum to the airstream.

The sound-driven air flow generating additional frictional electrostatic charges on the filter media that facilitates in attracting the particles to the filter media by different angles to the airstream.

In accordance with the exemplary embodiment the airborne particles, independent of their size, may oscillate under the same amplitude inside low or medium frequency sound waves. The oscillation of the particles or the particulate matter may enable the matter to get lodged into air filter media of the present application and may also remove smaller particles significantly more effectively than the conventional air filters. Since the sound waves do not increase pressure drop of the air stream passing through the air filter, the air filtration method of the present application does not require increased energy supply. Therefore, the air filtration method of the present application may be implemented using the air filter media with lower pressure drop to achieve a higher filtration efficiency.

In an exemplary embodiment, a plurality of sound waves may be generated by a mini-scale speaker with only 3 Watts rated power in an Energy Saving Sound Wave Air Filtering Device. The submicron particles present in the air may be enabled to oscillate a few hundred times in a second with an amplitude of above 1.5 micrometers. Further, by applying the sound waves perpendicular to the air stream, very fine particles may be intercepted by the filter media as particles are larger than one micrometer in size. Using only a few Watts in generating the sound power, the filtration efficiency of an air filter is significantly improved without increasing the pressure drop of the air filter. Thus, both filtration and energy efficiencies of the air filter of the present application is significantly improved as compared to the conventional air filters. In an embodiment, based on engineering calculations, it is observed that the Energy Saving Sound Wave ESSW air filter consumes 30-50% less power than the conventional air filters with same filtration efficiency. As would be appreciated by those of ordinary skill in the art, having the benefit of the present application, the present application is not limited to any specific values of the rated power and the amplitude. Accordingly, any other values of the rated power and the amplitude may be realized without departing from the scope of the present application.

In an embodiment of the present application, two or more acoustic wave generating devices may be combined with a low/medium efficiency air filter media to form the Energy Saving Sound Wave (ESSW) air filter. The sound wave generating devices and their fixture are characterized such that they are not consumable and may operate for long time, while the low/medium efficiency air filter media or filter media is a replaceable component.

The sound wave generating devices may be configured in a manner such that the sound waves generated propagates through the whole area and depth of the porous air filter. Further, the acoustic wave generating devices may be located in a manner such that the superposition of sound waves is minimized so as to avoid regions with low acoustic power inside the porous air filter. Extra-low voltage cable may be connected to the sound wave generating means for power supply.

In another embodiment, the air filtration method of the present application may use any porous air filter as the air filter media. The air filtration method of the present application may improve the filtration efficiency of the air filter without increasing the pressure drop across it.

It is to be noted that the performance of the Energy Saving Sound Wave (ESSW) air filtering device enabling the optimization of the energy, filtration and cost is based on following parameters:

Frequency of the sound waves—Increasing the frequency of the generated sound waves may benefit the filtration efficiency but simultaneously results in increasing the power consumed by the speakers. Therefore, a balance between the frequency of the sound waves and the power consumption is desired, but the optimized frequency depends on the target filtration efficiency rating and the air filter used. Therefore, the frequency of the acoustic wave generated varies in different configurations of the Energy Saving Sound Wave Air Filtering Device.

Displacement amplitude—The displacement amplitude of air in the sound wave directly affects the motion of air in the sound wave. Higher displacement amplitude of air results in greater vibration motion of particles in the filter media, which has positive impact to the filtration efficiency. However, to increase the displacement amplitude of air, the sound pressure level needs to be increased, which results in higher power consumption of the speakers. Therefore, a balance between the displacement amplitude and the power consumption is desired, but the optimized displacement amplitude depends on the target filtration efficiency rating and the air filter used. Therefore, the displacement amplitude varies in different configurations of the Energy Saving Sound Wave (ESSW) Air Filtering Device.

Air filter media—The performance of the air filter of the present application may further depend on the air filter media used. The overall filtration efficiency depends on the material and fiber density of the air filter media used.

Therefore, the air filter media varies in different configurations of the Energy Saving Sound Wave (ESSW) Air Filtering Device.

In an exemplary embodiment, based on engineering calculations, it is observed that, in order to maintain a balance between energy and filtration efficiencies, a sound wave frequency in a range of 50 Hz to 1000 Hz and a displacement amplitude in a range of 1.5 to 2.2 µm is desired. In an exemplary embodiment of the present application, the frequency of the sound waves, the displacement amplitude and filtration efficiency rating of the synthetic fiber air filter in an Energy Saving Sound Wave Air Filtering Device (with filtration efficiency rating about MERV 12 (ASHRAE 52.2-1999)) are 60-80 Hz, 1.5-1.8 µm and MERV 9 respectively. As would be appreciated by those of ordinary skill in the art, having the benefit of the present application, the present application is not limited to any specific values of the sound wave frequency and the displacement amplitude. Accordingly, any other values of the acoustic wave frequency and the displacement amplitude may be realized without departing from the scope of the present application.

In another embodiment of the Energy Saving Sound Wave Air Filtering Device/Air filter as disclosed in the present application, comprises a filter media layer/air filter media/filter media (interchangeably used) mounted within a frame. Further at least one fan may be positioned or mounted on either side of the filter media, i.e., either before the filter media or after the filter media. The at least one fan may be configured to maintain pressure drop between the filter media at optimum level within the filtering device in the AHU.

Further the pressure drop is maintained by controlling rotational speed of the at least one fan. The rotational speed may be controlled by an IoT based on narrowband. The IoT may be further configured to control frequency of acoustic wave generated by one or more sound wave generating means. The IoT may be configured to control the frequency and the rotational speed, based on value provided a plurality of sensors. The plurality of sensors may be mounted on the frame or positioned at various location within the AHU. The plurality of sensors may further be configured to detect the pressure difference, frequency, displacement amplitude, and particulate matter. In accordance with an exemplary embodiment voltage detected by voltmeter and ampere detected by ammeter may also be used to determine the particulate matter (PM), i.e., plurality of sensor may capture the values of the voltmeter and ammeter and relate the same with particulate matter.

The plurality of sensor may also be configured to detect failure, or fault in the AHU and send a signal to the IoT. The IoT may be further connected to a cloud server and may be further configured to send notification of the same to a user, wherein the user may be at remote location. The IoT as is disclosed in the present application may be a narrowband IoT (NB-TOT), connected to cloud service via universal controller as a communication module to provide real time monitoring and control with email/SMS fault notification to mobile and BMS.

The notification may pertain to malfunction of supply voltage, or current wiring for the buzzers, or pressure sensors, or differential pressure transducers. Further notification may also relate to fault detections like clogged filter media, etc.

Various embodiments of the present application will be described below in conjunction with the accompanying drawings.

Figure 2:
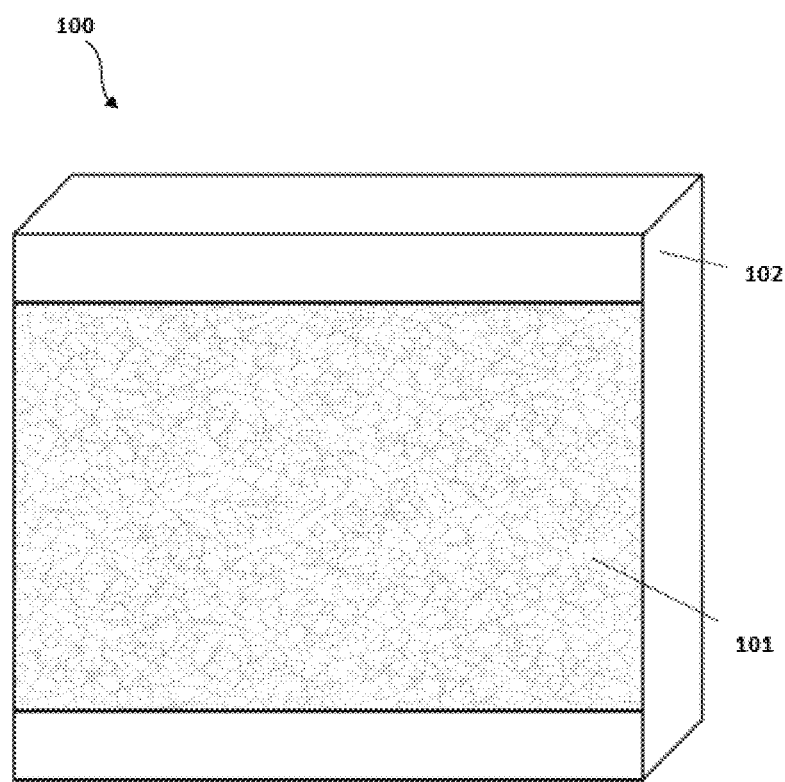
FIG. 2 illustrates a three-dimensional front view of the air filtration apparatus 100, in accordance with an embodiment of the present application.

Referring to FIG. 1, a front view of an air filtration apparatus 100 (also referred as "Air filter 100" interchangeably) is illustrated, in accordance with an embodiment of the present application. Further, FIG. 2 illustrates a three-dimensional front view of the air filtration apparatus 100, in accordance with an embodiment of the present application. As shown in FIG. 1 and FIG. 2, the air filtration apparatus 100 may comprise an air filter media 101. Hereinafter the air filter media 101, may be interchangeably used as filter media 101, or filter media layer 101. The filter media 101 may be a porous media made from either of a meltdown cloth or paper, polymer fiber, metal fiber and the like. As shown, the filter media 101 may be secured into a frame 102. The frame 102 may be made from material selected from a group comprising paper, metal, plastic, and ceramic, etc. The filter media 101 and the frame 102 may be replaceable and disposable. The air filtration apparatus 100 may further comprise one or more components/devices collectively enabling the air filtration, details of which are described further in conjunction with the corresponding drawings as below. Further in an alternate exemplary embodiment the frame 102 may be configured to hold/accommodate one or more layer of filter media 101.

Figure 3:
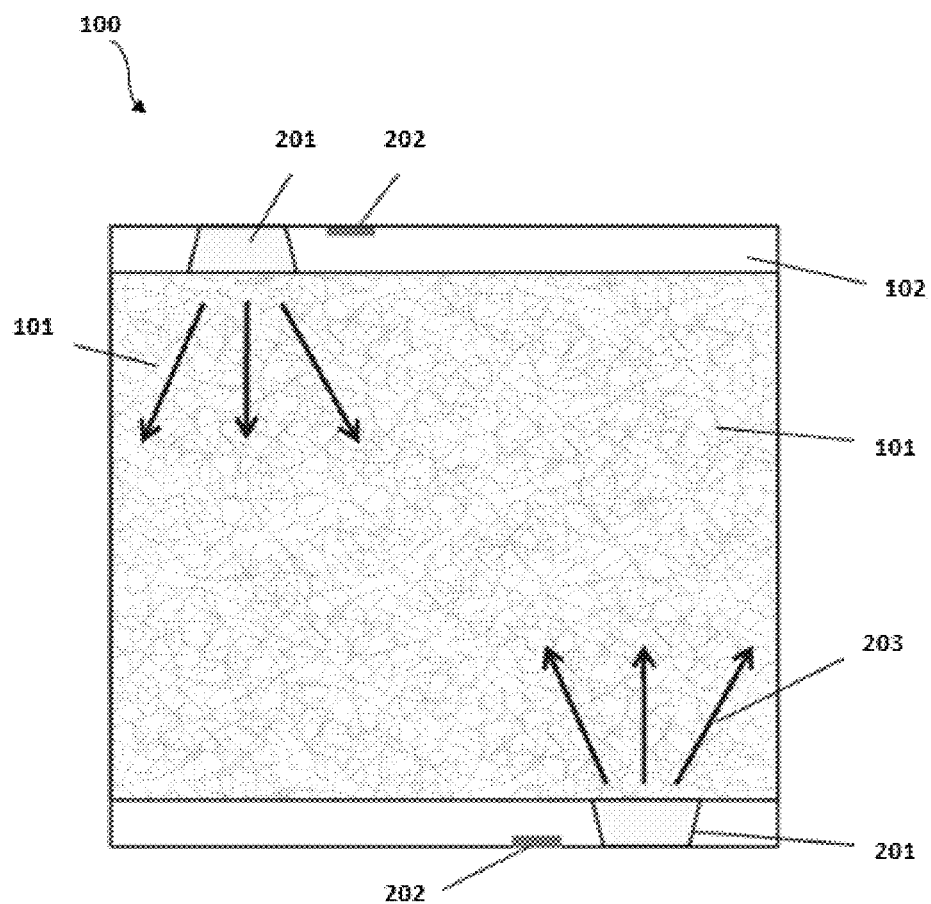
FIG. 3 is a cross-sectional view of the air filtration apparatus 100 including one or more sound wave generating means 201 inside the frame 102 is illustrated, in accordance with an embodiment of the present application.

Referring to FIG. 3, a cross-sectional view of the air filtration apparatus 100 including one or more sound wave generating means 201 inside the frame 102 is illustrated, in accordance with an embodiment of the present application. As shown, the sound wave generating means 201 may be secured in the frame 102. The number and location of the one or more sound wave generating means 201 may vary depending on the size of the Energy Saving Sound Wave Air Filtering Device 100/ air filtration apparatus 100. The one or more sound wave generating means 201 may further comprise at least one speakers with a plurality of pre-set frequencies, speakers with viable frequency control, full range speakers, full range speakers with pre-set frequency, full range speakers with viable frequency control, Mylar speakers, Mylar speakers with pre-set frequency, Mylar speakers with viable frequency control, acoustic transducers, acoustic transducers with pre-set frequency, acoustic transducers with viable frequency control, ultrasonic transducers, ultrasonic transducers with pre-set frequency, ultrasonic transducers with viable frequency control, and the like. The one or more sound wave generating means 201 may be controlled via a pre-programmed chip (e.g., a frequency control chip). The one or more sound wave generating means 201 may generate acoustic waves which propagate into the air filter media 101. The sound waves propagate in the direction 203 towards the air filter media 101 as shown in FIG. 3.

In an alternate exemplary embodiment, the one or more sound wave generating means 201, configured to generate acoustic waves which propagate into the air filter media 101, may be controlled by an IoT 202 based on narrowband as shown in FIG. 3. The IoT 202 may be configured to control the frequency and the amplitude of the one or more sound wave generating means 201. The IoT 202 may further be positioned within the frame 102 or externally.

In an embodiment, the air filter 100 may further comprise a battery (not shown in Figures) configured to supply power to the one or more sound wave generating means 201 and the IoT 202. The battery connection may be further replaced by an electrical power supply connection to power the one or more sound generating means 201 and the IoT 202.

Figure 4:
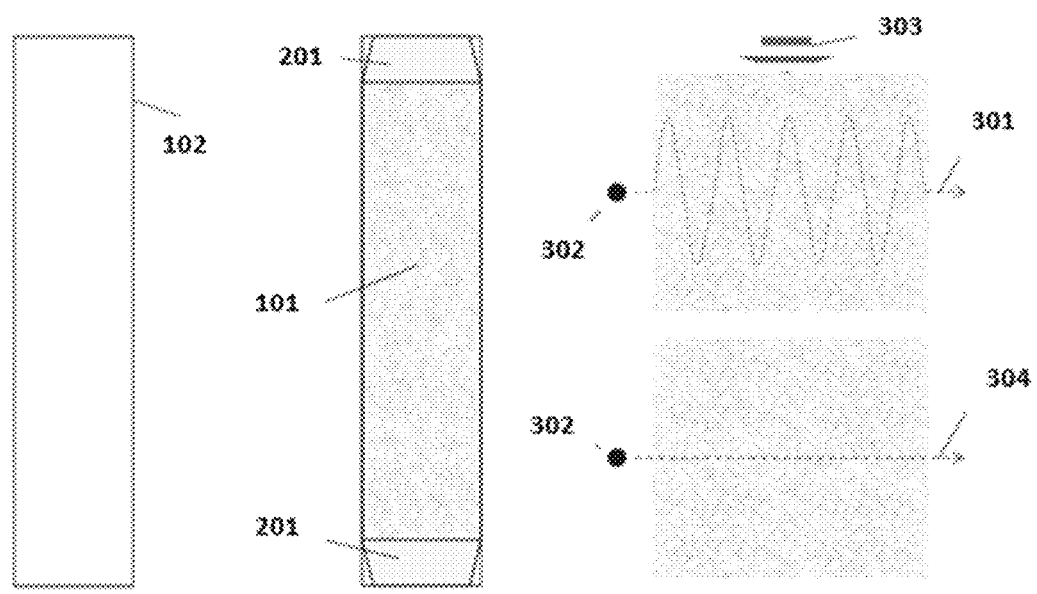
FIG. 4 is a side view, and the cross-sectional view of the air filtration apparatus 100 including the filter media 101 and the one or more sound wave generating means 201 in the frame 102 is illustrated, in accordance with an embodiment of the present application.

Referring to FIG. 4, a side view, and the cross-sectional view of the air filtration apparatus 100 including the filter media 101 and the one or more sound wave generating means 201 in the frame 102 is illustrated, in accordance with an embodiment of the present application. In order to obtain an optimized performance, the frame 102 may be adapted to enclose the filter media 101 without any void on the sides. The one or more sound wave generating means 201 may be secured on the top and bottom space inside the frame 102. The right most top of FIG. 4 illustrates additional vibration motion of the airborne particles as induced by the sound wave.

Further, a trajectory 301 (in form of a waveform) of a particle 302 passing through the filter media 101 under the control of a sound wave 303 generated via a one or more sound wave generating means 201 is shown. Further, in the right most bottom of the FIG. 4, a trajectory 304 (in form of a line) in which the particle passing through the filter media 101 without using the sound wave is shown.

Figure 5:
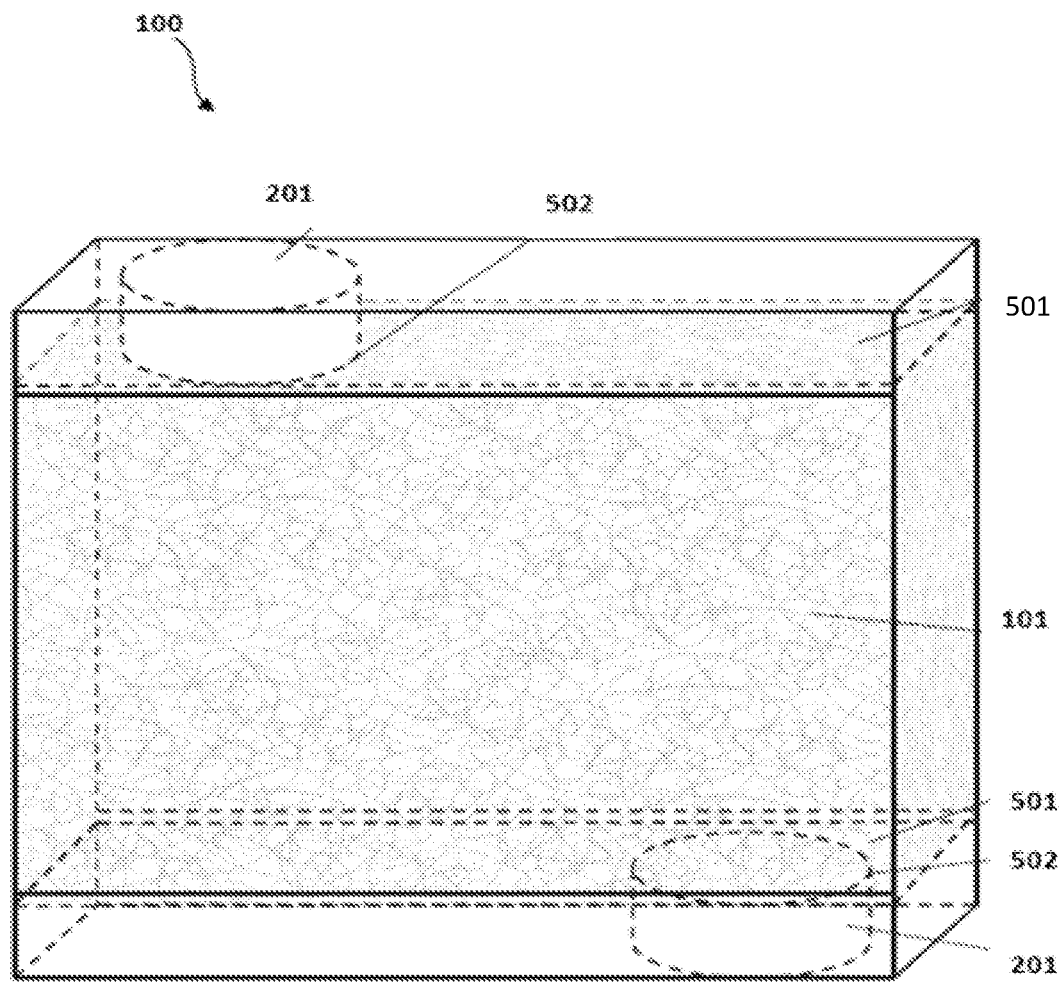
FIG. 5 is a three-dimensional transparent front view of the air filtration apparatus 100 including the filter media 101 and the one or more sound wave generating means 201 is illustrated, in accordance with an embodiment of the present application.

Referring to FIG. 5, a three-dimensional transparent front view of the air filtration apparatus 100 including the filter media 101 and the one or more sound wave generating means 201 is illustrated, in accordance with an embodiment of the present application. As shown in FIG. 5, the frame 102 may comprise two horizontal plates 501 to secure the filter media 101. The two horizontal plates 501 may prevent air particles from entering the spaces on top and bottom of the air filter 100. Each of the two horizontal plates 501 may have openings 502 to enable the sound waves, generated by the one or more sound wave generating means 201, to propagate into the air filter media 101.

Figure 6:
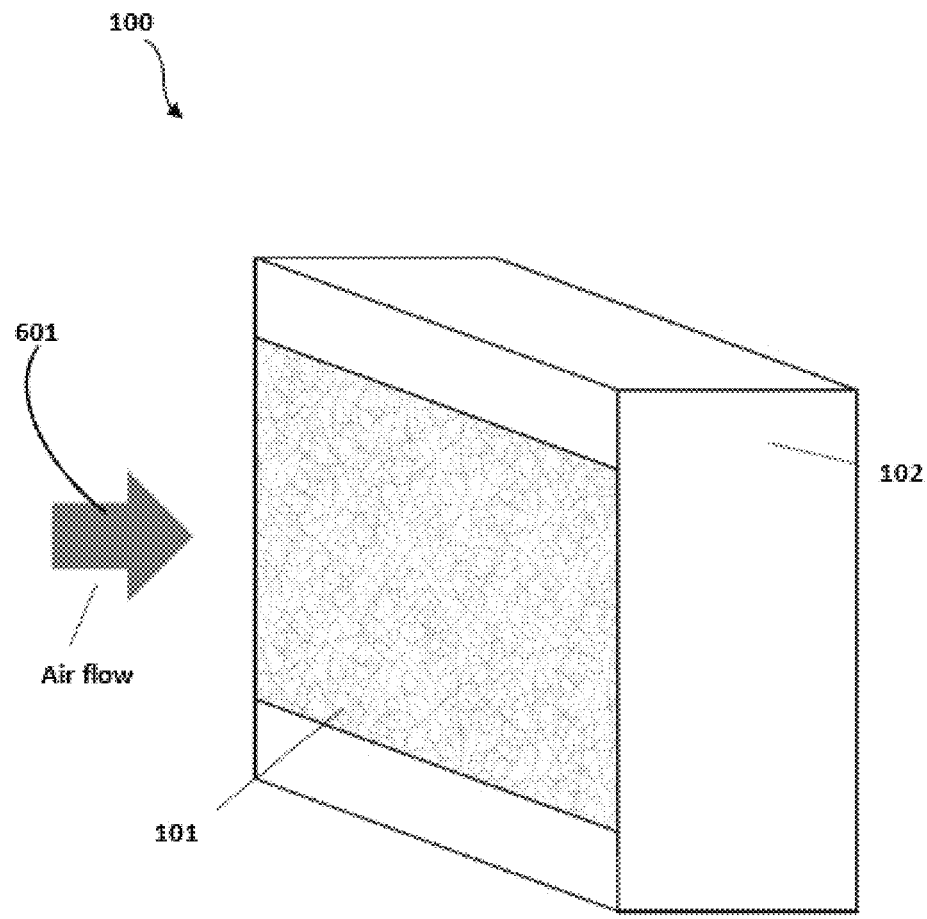
FIG. 6 illustrates a three-dimensional side view of the air filter 100 in accordance with an embodiment of the present application.
Figure 7:
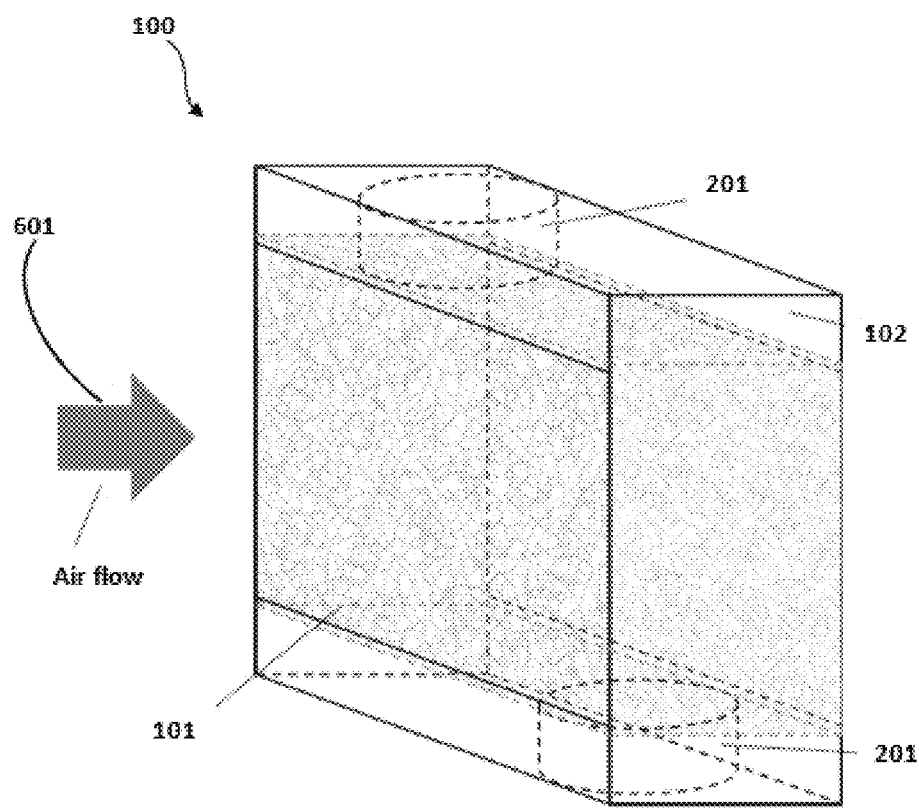
FIG. 7 illustrates a three-dimensional transparent side view of the air filter 100 in accordance with an embodiment of the present application.

Referring to FIG. 6 and FIG. 7, a three-dimensional side view and a three-dimensional transparent side view, respectively, of the air filter 100 are illustrated. As shown in FIG. 6, air flows in direction 601 towards the air filter 100. The air is passed through the air filter 100, where the sound wave generating devices 201 may generate acoustic wave propagating into the filter media 101. The sound waves may induce additional vibration motions of air particles in the air stream, which may increase the probability of the particles trapping onto the filter 100. The working of an exemplary Energy Saving Device aided air filter 100 along with its test, results of the test and analysis of the results is further described in accordance with an exemplary embodiment in reference to FIG. 8-FIG. 10 as below.

THE ENERGY SAVING SOUND DEVICE AIR FILTERING DEVICE

Figure 8:
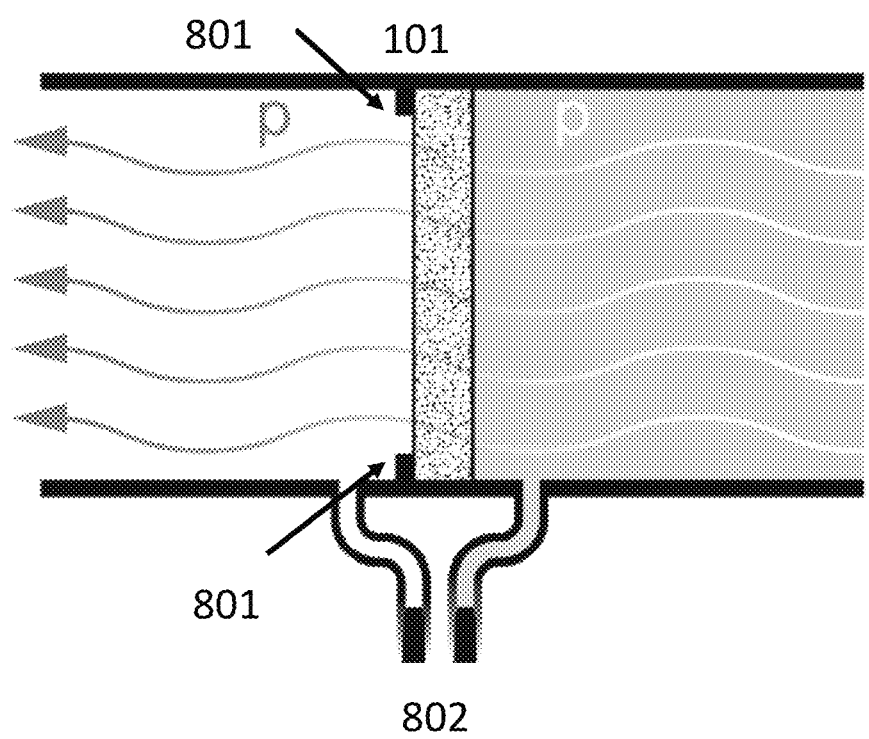
FIG. 8 illustrates a plurality of locations of openings, in accordance with an embodiment of the present application.

In an exemplary embodiment, an Acoustic Aided Particulate Air Filter was constructed based on a fiber pleated media filter having a length of 12 inches, width of 12 inches and thickness 4 inches. The said filter media is classified as F5 in accordance with EN799. The fiber pleated filter media has a paper frame. Two round openings, each of 8 cm diameter, were cut on the paper frame from left to right and top to bottom to allow sound wave to propagate into the fiber pleated media from the sides. The locations of the openings 801 are indicated in FIG. 8. In accordance with FIG. 8, the filter media 101 (ESS sound wave filter 1004), may be configured to pass the sound waves received at openings 801. Further a pressure differential measurer 802, may be configured to detect the pressure drop in the air before entering the filter media 101 and after passing through the filter media 101.

Figure 9:
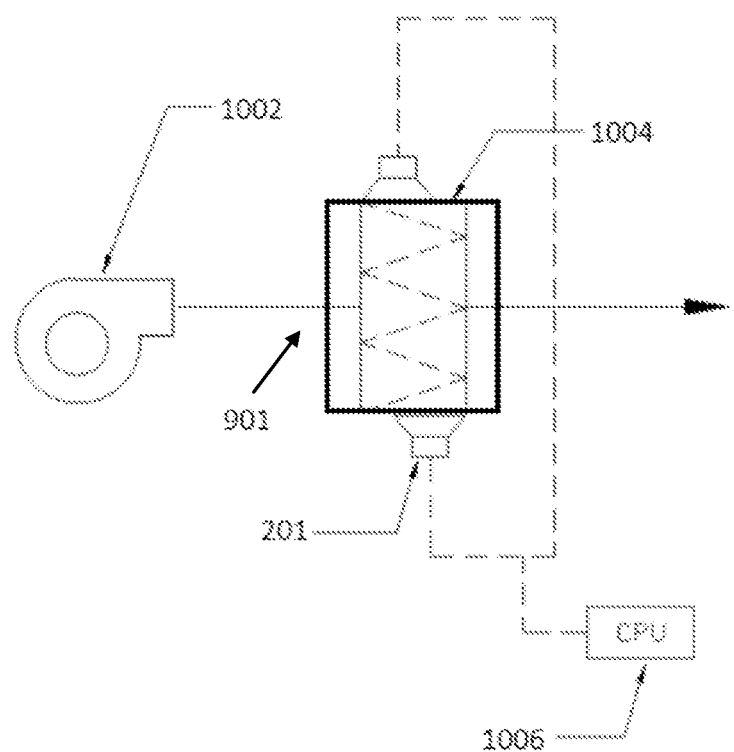
FIG. 9 illustrates a schematic of a square plastic duct 901, full range speakers 201 and a computer of the air filtration apparatus 100, in accordance with an embodiment of the present application.

FIG. 9 shows schematic of the test step-up in accordance with exemplary embodiment, wherein the test step comprises a square plastic duct 901, full range speakers 201 and a computer/CPU 1006. Further, as shown, an air blower 1002 drives the air through the ESS sound wave filter 1004 (filter media 101). In accordance with an exemplary embodiment the CPU 1006 may be coupled to a speaker 201. The CPU 1006 with a frequency generator software may control the frequency and amplitude of sounds waves generated in the speaker 201.

FACILITIES AND INSTRUMENTS

Figure 10:
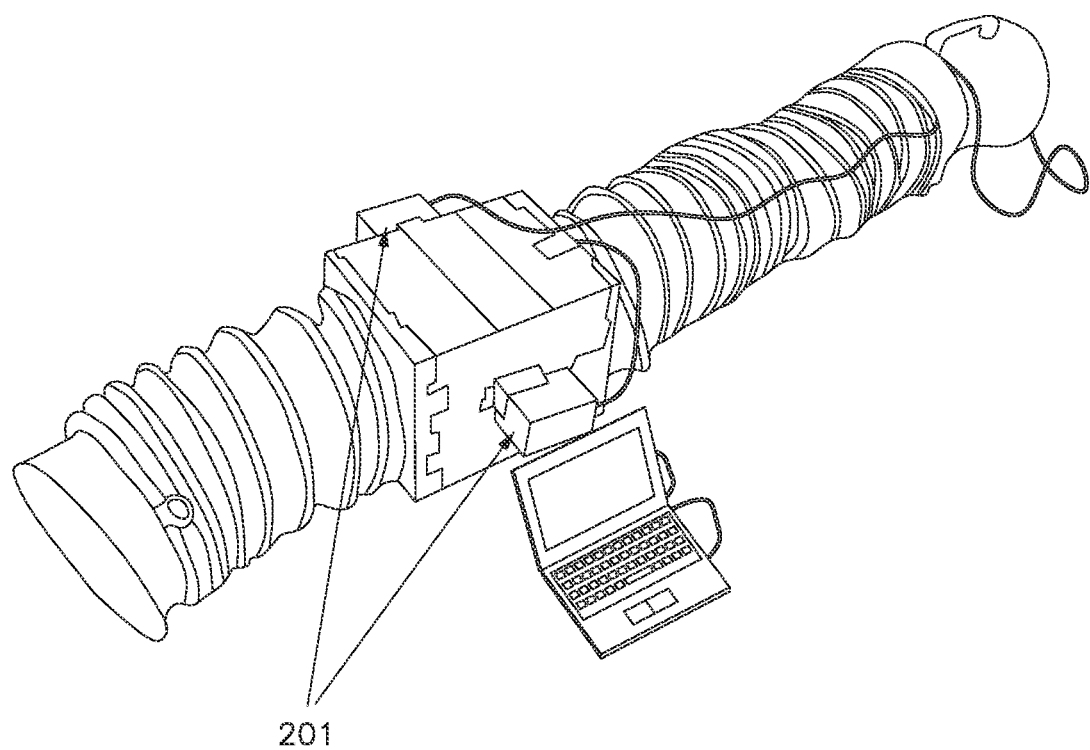
FIG. 10 illustrates an experimental set up containing flexible ducts and air blower connected to the square plastic duct for testing the air filtration apparatus 100, in accordance with an embodiment of the present application.

The test was conducted in a 40 m² room. There was no other activity in the room during the test. As shown in FIG. 10, two flexible ducts were connected to the square plastic duct. Further, as shown, an air blower (550 W model, Jia Yi) was connected to the other end of the longer flexible duct. The air blower drove air through the filter and the flexible duct. All connections were well sealed. FIG. 10 shows the connected flexible ducts and the air blower.

The following measurement instruments were used in the test:

| Manufacturer | Type/Model No. | Equipment |
|---|---|---|
| Met One | Aerocet-531S | Portable particle counter |

| Manufacturer | Type/Model No. | Equipment |
|---|---|---|
| Delta Ohm | HD2010UC/A | Sound level meter |

| Manufacturer | Type/Model No. | Equipment |
|---|---|---|
| Skywatch | Xplorer 1 | Anemometer |

The portable particle counter was used to measure the particle concentrations in PM 1, PM 2.5, and PM 10 with and without the effect of sound wave. The sound level meter was used in measuring and adjusting the sound power output (in dB) of the speakers. The anemometer was used in measuring and adjusting the flow velocity of the air blower. All measurement instruments were calibrated within 1 year from the testing day.

Figure 11:
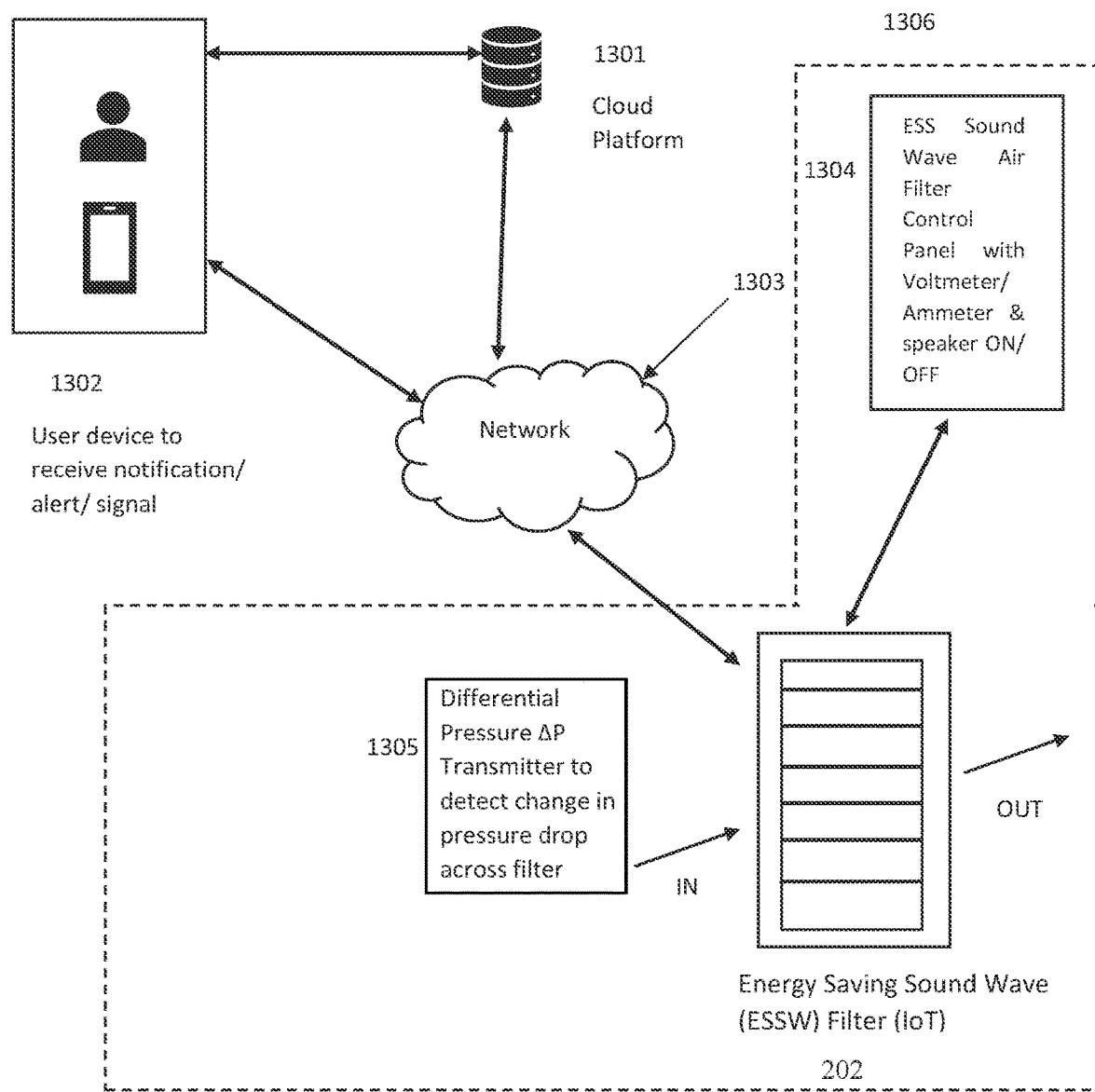
FIG. 11 illustrates a system in accordance with the present disclosure.

FIG. 11, illustrates structure of ESS Sound Wave Air Filter Control Panel. The ESS sound wave air filter 1000, may comprise a power supply unit 1101 to power the one or more sound wave generating devices 201, an IoT 202 based on narrowband, and at least one fan 1102 configured to generate forced draft. The air particle or particulate will under the energy saving sound wave to pass through MERV 7 to 8 filter media 101 to improve the filtration efficiency from 57.87% to 93.64% to MERV rating up to 13 to 14.

Figure 12:
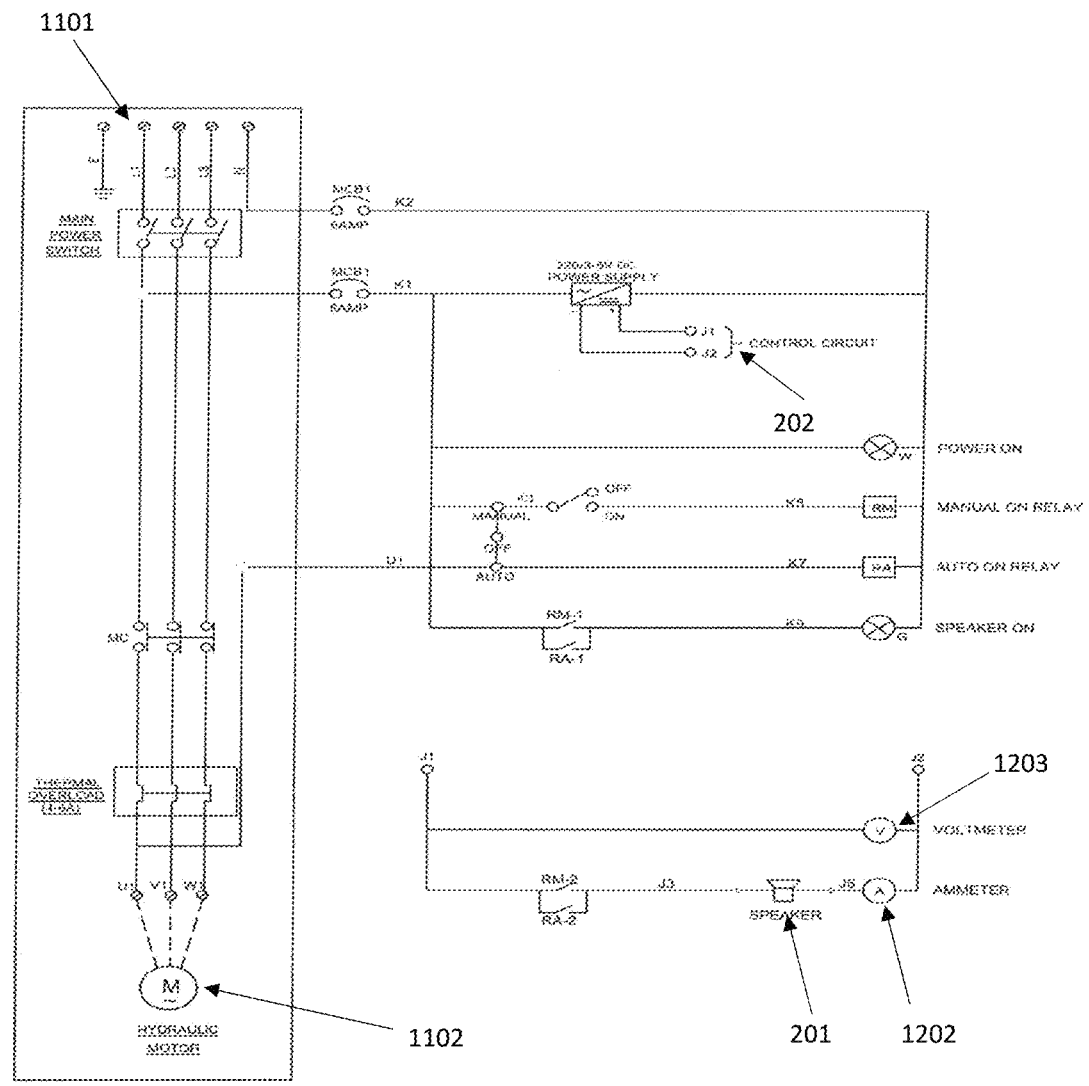
FIG. 12 illustrates a schematic of ESS Sound Wave Air Filter Control Panel.

FIG. 12, illustrates a schematic of ESS Sound Wave Air Filter Control Panel. The schematic, as illustrated shows a power supply unit 1101, configured to supply power to at least one fan 1102 shown has hydraulic motor to maintain pressure drop across filter media 101. The power supply unit 1101, is further configured to supply power to one or more sound wave generating means 201, a buzzer 1201, a voltmeter 1202 and an ammeter 1203.

Further the power is also supplied to an IoT 202 provided in the schematics. The IoT 202 based on narrowband, may be configured to control frequency, and/or displacement of the one or more sound wave generating means 201 based on the inputs received from the voltmeter 1202 and the ammeter 1203, wherein the voltmeter 1202 and the ammeter 1203 may act as a plurality of sensors configured to generate a value and send the same to the IoT 202.

Further the voltmeter 1202 and the ammeter 1203 or pressure sensors may be used to detect pressure drop in the air filter. Once the detected pressure drop reaches a threshold, a signal may be sent to the IoT 202, to control rotational speed of the at least one fan 1102 or rpm speed of the hydraulic motor. By controlling the at least one fan 1102 to maintain the pressure drop along with controlling the frequency of the one or more sound wave generating means 201, the IoT 202 is enabled to efficiently manage efficiency of the air filter.

Further the IoT 202 may be communicably connected with a cloud platform via standard MQTT connectivity protocol, to provide seamless communication with cloud platform. The IoT 202 along with the cloud platform, and/or the buzzer 1201 may help with preventive maintenance of AHU by fault detection, or malfunction detection. The IoT may be configured to send a notification may be in a form of SMS to a user upon detection of the fault or malfunction.

In an exemplary embodiment of the present disclosure the IoT may be configured to use at least one of communication protocol such as 1/NB-IOT Network MQTT, 2/4 x Digital Input, 3/4 x Digital Output, 4/4 x Analog input (0-10V) 5/4 x Analog output (PWM or 0-10V), 6/1 UART (RS485) 7/ Panel mount, 8/24 VDC.

FIG. 11 illustrates a system in accordance with the present disclosure. The IoT 202 may be communicably connected to a cloud platform 1301 via a network 1303. Further the IoT may be configured to send notification directly to a user/user device 1302 or via the cloud platform 1301.

Further the IoT 202 based on narrowband may be easily customizable to provide low power consumption, low-cost solution, and easily expandable by adding more sensors like voltmeters/current ammeters and peripherals for the potential applications.

In accordance with the exemplary embodiment a control panel 1304 may be communicably connected to the IoT 202 energy saving sound wave (ESSW) filter. The control panel 1304 may further comprise voltmeter and ammeter. The voltmeter and the ammeter may be configured to detect voltage and ampere in the air filter system. Further a pressure sensor 1305, may be communicably connected to the control panel and the IoT 202 energy saving sound wave (ESSW) filter. Further the pressure sensor 1305, may be placed in the AHU 1306 to detect the pressure drop before and after the filter. Here, the control panel 1304, the pressure sensor 1305 and the IoT 202 energy saving sound wave (ESSW) filter collectively form the AHU 1306.

In accordance with the exemplary embodiment, the voltmeter, ammeter and the pressure sensor 1305, may be configured to further control the rotational speed of the fan, which in turn controls the pressure drop.

The sensors like voltmeters/current ammeters may configured to generate an electronic signal upon sensing of the differential pressure figures. Further the sensor enables to calculate the energy saving, based on the IoT 202 to sense pressure drop & fan power profiles of the AHU 1306 and the electrical voltage (V) and current (ampere), which is up to 16% compared to the conventional one acoustic air filter.

Figure 13:
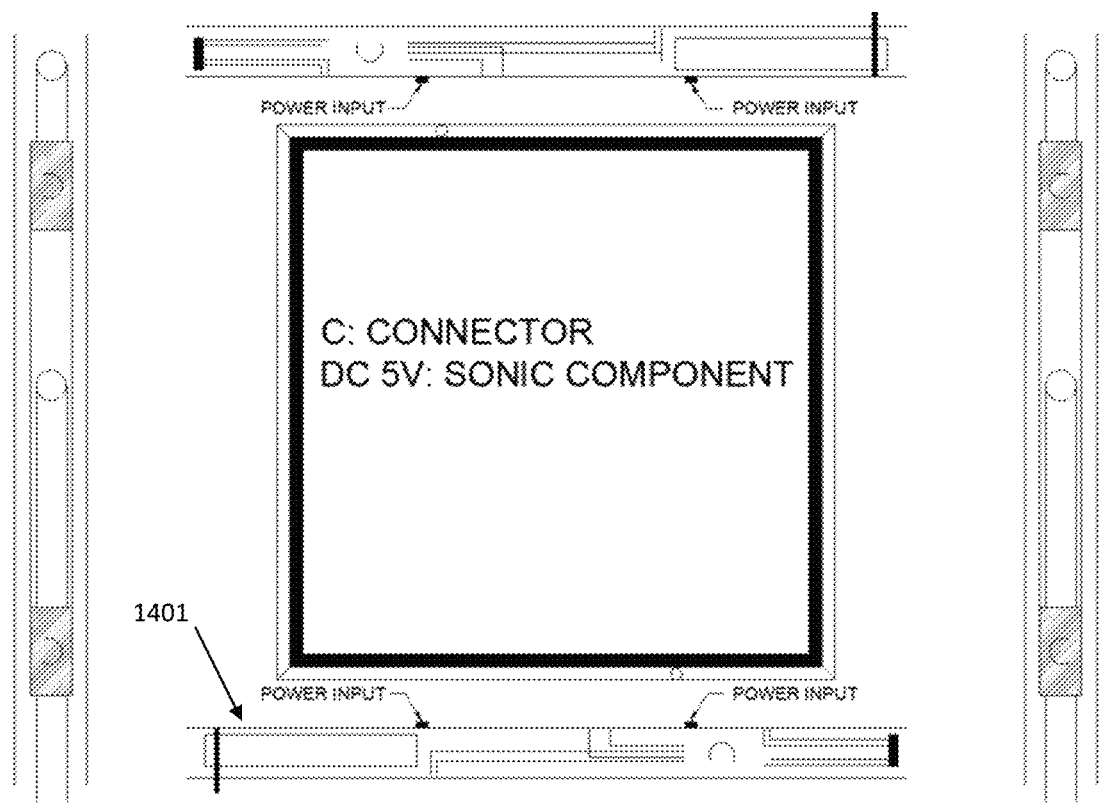
FIG. 13 illustrates the new frame assembly for the performance of the air purifiers and illustrates the new frame assembly for the performance of the air purifiers.

FIG. 13 illustrates the new frame assembly for the performance of the air purifiers and illustrates the new frame assembly for the performance of the air purifiers. The new frame 1401 may further comprise a filter media. The frame 1401 may further comprise power input positioned at the top of the frame 1401 and the bottom of the frame 1401.

TEST METHODOLOGY

Particles from fuming incense were used as test particles. The particles from fuming incense were passed into the middle section of the flexible duct around 1.5 m distance before the square plastic duct 901 (shown in FIG. 9) through an opening. The steady-state particle concentrations after the filter, with and without the speakers turned on, were measured for comparison. All measurements were repeated for 3 times and average values were used in the comparison and analysis. A total of 3 different sound wave frequencies, 65 Hz, 150 Hz and 300 Hz, with 2 different flow velocities (−0.5 m/s and −1 m/s) were considered in the testing.

RESULTS

In accordance with the exemplary the air filter/energy saving sound wave air filtering device as disclosed for energy saving embodiment, under sound wave of 65 Hz and 150 Hz, the particle concentrations were reduced by 8% to over 50% (average reduction: 26.9%) when compared to the concentrations without the IoT in the air filter. For sound wave of 300 Hz, the concentration reductions were generally lower than 65 Hz or 150 Hz. Table 1 below summaries the testing results.

TABLE 1

Summary of concentration data and concentration reduction with IOT (concentration unit: μg/m³)

| | Without IOT | With IOT sensor (ΔP) | % Reduction | Without IOT | With IOT sensor (ΔP) | % Reduction | Without IOT | With IOT sensor (ΔP) | % Reduction |
|---|---|---|---|---|---|---|---|---|---|
| Condition | 65 Hz, 81 dB, 1 m/s | | | 65 Hz, 81 dB, 0.6 m/s | | | | | |
| PM 1 | 19.2 | 10.2 | 46.9 | 13.2 | 7.6 | 42.4 | | | |
| PM 2.5 | 24.3 | 13.3 | 45.3 | 14.7 | 9.6 | 34.7 | | | |
| PM 10 | 27 | 16.3 | 39.6 | 20 | 12.9 | 35.5 | | | |
| Condition | 150 Hz, 81 dB, 0.8 m/s | | | 150 Hz, 81 dB, 0.5 m/s | | | 300 Hz, 86 dB, 0.5 m/s | | |
| PM 1 | 16.4 | 8.9 | 45.7 | 13.3 | 5.8 | 56.4 | 6.9 | 6.2 | 10.1 |
| PM 2.5 | 15.7 | 12 | 23.6 | 16.4 | 12 | 26.8 | 9.4 | 8.5 | 9.6 |
| PM 10 | 20.8 | 17.0 | 18.3 | 18.5 | 17.3 | 6.5 | 14 | 11 | 21.4 |

In an exemplary embodiment for testing a filter media having dimensions 300×600×50 mm or 600 mm×600 mm×50 mm were used. Further during the test an initial pressure drop was observed as 18.5 Pa at a velocity of 1 m/s; 35.9 Pa @ 2 m/s; 44.6 Pa @ 2.5 m/s. For the standardization of the test Operating Frequency was kept at 3.3 KHz Voltage.

The following table 2 illustrates efficiency of air filter with an IoT configured to control the pressure drop and the frequency of the sound.

TABLE 2

| MERV 12 | 80 | 90 | |
|---|---|---|---|
| MERV11 | 65 | 85 | up to MERV14 |
| MERV10 | 50 | 80 | |
| MERV9 | 35 | 75 | up to MERV13 |
| MERV8 | 20 | 70 | up to MERV12 |

For instance, to improve filtration efficiency MERV12 from 80% to 90% after using ESSW air filter.

TABLE 3

Summary of concentration data and concentration reduction without IOT (concentration unit: μg/m³)

| | Without Acoustic Wave | With Acoustic Wave | % Reduction | Without Acoustic Wave | With Acoustic Wave | % Reduction | Without Acoustic Wave | With Acoustic Wave | % Reduction |
|---|---|---|---|---|---|---|---|---|---|
| Condition | 65 Hz, 81 dB, 1 m/s | | | 65 Hz, 81 dB, 0.6 m/s | | | | | |
| PM 1 | 19 2 | 12.7 | 33.9 | 13.2 | 9.3 | 29.7 | | | |
| PM 2.5 | 24.3 | 16.2 | 33.3 | 147.7 | 11.7 | 20.9 | | | |
| PM 10 | 27 | 19.9 | 26.3 | 20 | 15.7 | 21.8 | | | |
| Condition | 150 Hz, 81 dB, 0.8 m/s | | | 150 Hz, 81 dB, 0.5 m/s | | | 300 Hz, 86 dB, 0.5 m/s | | |
| PM 1 | 16.4 | 9.9 | 39.9 | 13.3 | 6.6 | 50.4 | 6.9 | 6.5 | 5.8 |
| PM 2.5 | 15.7 | 12.6 | 19.7 | 16.4 | 12.2 | 25.6 | 9.4 | 8.7 | 7.4 |
| PM 10 | 20.8 | 18.1 | 12.8 | 18.5 | 17 | 8.1 | 14 | 11.4 | 18.6 |

Based upon the results illustrated above, it is observed that the Energy Saving Sound Wave Air Filtering Device could significantly reduce the concentration of airborne particles. Generally, the Energy Saving Sound Wave Air Filtering could reduce the concentration of smaller particles (PM 1 and PM 2.5) more effectively than larger particles (PM 10).

The above efficiency and table may be generated using the following equations:

Filtration efficiency=1–[PM concentration after the filters/PM concentration before the filters]

Fan power energy saving=3 1/2×power factor×difference in current and voltage

Performance Enhancement=filtration eff. of ESS sound wave filters — filtration eff. of existing filters/filtration eff. Of existing filters Filtration efficiency=1–(93.84/53.87)=1–1.74=– 0.74=–74%  A)

Fan power saving=1.732×0.85×220×0.1=32.39 W compared to the original power at Fan motor power at 200 w so the energy saving about 16% compared to the conventional one at energy saving at 10%  B)

Performance Enhancement =74%-50%/50%=48%  C)

ANALYSIS

The testing results indicate that Energy Saving Sound Wave Air Filtering Device enhances the filtration efficiency of the air filter. The results suggest that higher frequency may not improve the efficiency. This could be related to the magnitude of the vibration motion induced by the sound wave on the particles. Although higher sound wave frequency increases the frequency of vibration of airborne particles, however, the higher sound wave frequency also reduces the magnitude of the particle vibration motion under the same sound pressure level. This is also favorable from the energy efficiency aspect, as less energy to generate a lower frequency sound wave is required. Further, it is observed that the flow velocity does affect the efficiency of the Energy Saving Sound Wave Air Filtering Device. In practice, the frequency and sound power level should be selected for an optimized performance over the common range of air flow velocity. Current device was based on an EN799 F5 grade filter. It is expected that the performance of the Energy Saving Sound Wave Air Filtering Device may be further enhanced when combined with higher grade filters since they have denser fiber media.

The sound pressure level used in the 65 Hz and 150 Hz tests were about 55 and 65 dBA respectively. These sound levels are quieter than MVAC plant room and shall be even lower when the system is operated in duct. Therefore, the system should have little-to-no contribution to hearing noise. Smaller airborne particles have greater impacts on health and clean manufacturing. The Energy Saving Sound Wave Air Filtering Device could enhance the removal of PM 1 and PM 2.5 significantly. Therefore, the Energy Saving Sound Wave Air Filtering Device of the present application has promising applications in Air Purifier & Health Care domains.

Although implementations for apparatuses, devices and methods for air filtration have been described in language specific to structural features and/or methods, it is to be understood that the appended claims are not necessarily limited to the specific features or apparatuses, devices and methods described. Rather, the specific features and apparatuses, devices and methods are disclosed as examples of implementations for the air filtration.

What is claimed is:
1. An air filter, comprising:
   a filter media adapted to capture and filter one or more impurities from air;
   one or more sound wave generators provided at one or more sides of the filter media, wherein the one or more sound wave generators generate acoustic waves to be propagated into the filter media;
   a plurality of sensors comprising a combination of a voltmeter, an ammeter and a pressure sensor configured for detecting a pressure before and after air enters filter media in order to determine a pressure drop, and further the plurality of sensors is also configured to determine an AHU to be functioning or malfunctioning;
   at least one fan positioned before or after the filter media; and an IoT based on narrowband, configured to control frequency of the acoustic waves generated by the one or more sound wave generators, and the AHU to control rotational speed of the at least one fan in order to maintain the pressure drop based on value provided by the plurality of sensors.

2. The air filter of claim 1, wherein propagation of the acoustic waves into the filter media facilitates in:
increasing travel distance of the one or more impurities inside the filter media thereby enabling the filter media to intercept the one or more impurities;
generating turbulence in the filter media thereby enabling the filter media to enhance capturing of the one or more impurities based on enhanced turbulent diffusion effect; and
generating frictional electrostatic charges on the filter media thereby enabling the filter media to attract the one or more impurities.

3. The air filter of claim 1, wherein the one or more impurities comprise one or more of dust, particles, airborne microorganism, virus, and allergens.

4. The air filter of claim 1, wherein the filter media is a porous filter layer made of a material selected from a group comprising a natural fiber, a metal fiber, a metal foam, and a synthetic fiber.

5. The air filter of claim 4, wherein the natural fiber is a paper or a cotton.

6. The air filter of claim 4, wherein the synthetic fiber is a polyester plastic material.

7. The air filter of claim 4, wherein the filter media is an antimicrobial media layer or a washable filter media layer.

8. The air filter of claim 1, further comprising a frame adapted to secure the filter media and the one or more sound wave generators.

9. The air filter of claim 8, wherein the frame is made of a paper or a plastic or a metal, and wherein the frame is capable of being reused or disposed with the air filter.

10. The air filter of claim 8, wherein the one or more sound wave generators comprise either of a speaker, an acoustic transducer, an ultrasonic transducer, and a device including a single driver element, or a voice coil used to move and control a diaphragm.

11. The air filter of claim 10, wherein the speaker is either of a speaker with a plurality of pre-set frequencies, a speaker with a viable frequency control, a full range speaker, a full range speaker with a pre-set frequency, a full range speaker with a viable frequency control, a Mylar speaker, and a Mylar speaker with a pre-set frequency.

12. The air filter of claim 1, wherein the IoT is further communicably connected to a cloud server via MQTT connectivity protocol.

13. The air filter of claim 1, further comprising a battery or an electrical connection configured to supply power to the one or more sound wave generators, the IoT, and the at least one fan.

14. The air filter of claim 1, wherein the IoT is further configured to send notification pertaining to malfunction, or fault, or detection of differential pressure.

15. A method of air filtration, comprising:
capturing, via a filter media, one or more impurities from air;
generating, via one or more sound wave generators, sound waves to be propagated into the filter media, wherein propagation of the sound waves into the filter media facilitates in increasing travel distance of the one or more impurities inside the filter media thereby enabling the filter media to intercept the one or more impurities;
generating turbulence in the filter media thereby enabling the filter media to enhance the capturing of the one or more impurities based on enhanced turbulent diffusion effect and generating frictional electrostatic charges on the filter media thereby enabling the filter media to attract the one or more impurities;
detecting, via a plurality of sensors comprising a combination of a voltmeter, an ammeter and a pressure sensor, a pressure before and after air enters filter media in order to determine a pressure drop;
determining, via the plurality of sensors, an AHU to be functioning or malfunctioning; and
controlling, via an IoT, frequency of the sound waves generated by the one or more sound wave generators, and the AHU to control rotational speed of at least one fan positioned either before or after the filter media in order to maintain the pressure drop based on value provided by the plurality of sensors.

16. The method of claim 15, further comprising securing, via a frame, the filter media and the one or more sound wave generators.

17. The method of claim 16, further comprising supplying, via a battery or an electrical connection, power to the one or more sound wave generators, the IoT, and the at least one fan.

18. An air filtration apparatus, comprising:
an air filter media;
one or more sound wave generating devices attached at one or more sides of the air filter media, wherein the one or more sound wave generators generate sound waves to be propagated inside the air filter media thereby enabling the air filter media to intercept and filter one or more impurities from the air;
a frame securing the air filter media and the one or more sound wave generating devices on right top and left bottom sides openings;
a plurality of sensors comprising a combination of a voltmeter, an ammeter and a pressure sensor configured for detecting a pressure before and after air enters filter media in order to determine a pressure drop, and further the plurality of sensors is also configured to determine an AHU to be functioning or malfunctioning;
at least one fan positioned before or after the air filter media;
an IoT configured to control frequency of the sound waves generated by the one or more sound wave generators, and the AHU to control rotational speed of the at least one fan in order to maintain the pressure drop based on value provided by the plurality of sensors; and
a power supply to power the one or more sound wave generators, the IoT, and the at least one fan.

19. The air filtration apparatus of claim 18, wherein the air filter media is a porous filter made of a material selected from a group comprising a natural fiber, a metal fiber, a metal foam, and a synthetic fiber.

20. The air filtration apparatus of claim 18, wherein the one or more sound wave generators comprise either of a speaker, a sound transducer, an ultrasonic transducer, and a device including a single driver element, or a voice coil used to move and control a diaphragm.

21. The air filtration apparatus of claim 18, wherein the frame is made of a paper or a plastic or a metal, and wherein the frame is capable of being reused or disposed with the air filtration apparatus.

22. The air filtration apparatus of claim 18, wherein the IoT is further communicably connected to a cloud server via MQTT connectivity protocol.

23. The air filtration apparatus of claim 18, wherein the IoT is further configured to send notification pertaining to malfunction, or fault, or detection of differential pressure.

\* \* \* \* \*